Patented Jan. 16, 1923.

1,442,520

UNITED STATES PATENT OFFICE.

HYYM E. BUC, OF ROSELLE, NEW JERSEY, ASSIGNOR, BY MESNE ASSIGNMENTS, TO STANDARD DEVELOPMENT COMPANY, A CORPORATION OF DELAWARE.

PURIFICATION OF ISOPROPYL ETHER.

No Drawing. Application filed October 26, 1921. Serial No. 510,637.

*To all whom it may concern:*

Be it known that I, HYYM E. BUC, a citizen of the United States, residing at 620 Locust Street, Roselle, in the county of Union and State of New Jersey, have invented a new and useful Improvement in the Purification of Isopropyl Ether, of which the following is a specification.

The present invention relates to the purification of isopropyl ether, and more particularly to the purification of crude ether obtained, for example, by the treatment of isopropyl alcohol with sulfuric acid under the proper conditions of concentration and temperature. The crude ether subjected to treatment in accordance with the present process may have associated with it small quantities of isopropyl alcohol, propylene and polymerized hydrocarbons, as well as compounds, the character of which is as yet unknown, which cause a marked discoloration of the crude material and impart to it foreign, disagreeable odors.

In accordance with the present invention, the crude isopropyl ether is subjected to the action of diluted sulfuric acid of a concentration between 65 and 80% $H_2SO_4$. 75% sulfuric acid is preferred, as it appears to give the best results in practice. The ether dissolves in the sulfuric acid almost instantaneously, with evolution of heat. The proportion of sulfuric acid may be varied greatly and the sulfuric acid used may be added as a whole or in fractional portions. The total volume of sulfuric acid employed thus may be from $\frac{1}{2}$ the volume of crude ether upwards. In practice it is preferred to add the diluted sulfuric acid to the crude ether in portions each having about one-half the volume of the original crude ether and continuing this until the addition of the acid causes no further substantial rise in temperature. The solution of ether in sulfuric acid is preferably decanted before the addition of the next portion of sulfuric acid. The ether solutions are mixed after their withdrawal.

The sulfuric acid solution of the ether may then be diluted with water until the greater portion of the ether is thrown out as a supernatant layer. This stage is readily recognizable by the appearance of the mixture and by the fact that on further addition of water, the volume of the ether does not increase. In general, it is found sufficient to dilute the solution of ether in sulfuric acid until the separated acid layer has a strength of about 25% sulfuric acid.

The separated ether may then be dried in any suitable manner; for example, by the addition of quick lime or calcium chloride and distillation of the dehydrated ether. The acid layer which separates on dilution of the sulfuric acid solution of ether with water contains a small proportion of the ether, as the ether is soluble to the extent of 4 or 5% in water. This solution may be fractionally distilled to separate the dissolved ether, which may then be dehydrated and distilled in the manner described above and may be added to the purified ether or to a fresh batch of ether subjected to the purifying operation.

If desired, the crude ether may be subjected to washing with water prior to its treatment with sulfuric acid. This washing with water will remove any water-soluble impurities contained in the crude ether, as for example, isopropyl alcohol. Any ether dissolved in the wash water may be separated by fractional distillation and, if desired, added to the ether undergoing purification.

The purified isopropyl ether obtained in accordance with the present invention is a colorless liquid having a boiling point of 68.2 to 68.7° C.

I claim:

1. The method of purifying isopropyl ether which comprises admixing the ether with sulfuric acid of a strength between 65 and 80%, diluting the resultant solution of the ether in the acid, thereby separating the ether.

2. The method of purifying isopropyl ether which comprises admixing the ether with sulfuric acid of a strength of about 75%, diluting the resultant solution of the ether in the acid thereby separating out the ether, and removing the ether from the diluted acid.

3. The method of purifying isopropyl ether which comprises admixing the crude ether with successive portions of sulfuric acid of a strength between 65 and 80%, said portions each having a volume of about one-half that of the crude ether, until substantially complete solution of the ether has taken place, adding water to the solution of ether, in sulfuric acid until the ether separates therefrom and removing the ether from the diluted acid.

4. The method of purifying isopropyl ether which comprises admixing the crude ether with successive portions of 75% sulfuric acid, the volume of each of said portions being about one-half that of the crude ether, until solution of the ether in the sulfuric acid is substantially complete, adding water to the solution of ether in sulfuric acid until the ether separates therefrom, and removing the separated ether.

5. The method of purifying isopropyl ether which comprises admixing the ether with sulfuric acid of a strength between 60 and 85%, diluting the resulting solution of ether in the acid with water thereby separating out the ether, removing and dehydrating the separated ether.

6. The method of purifying isopropyl ether which comprises washing the crude ether with water, then admixing it with sulfuric acid with a strength between 60 and 85%, thereby dissolving the ether, adding water to the resulting solution of ether to separate out the ether and removing the separated ether.

HYYM E. BUC.